United States Patent
Witchel et al.

(10) Patent No.: US 6,748,584 B1
(45) Date of Patent: Jun. 8, 2004

(54) METHOD FOR DETERMINING THE DEGREE TO WHICH CHANGED CODE HAS BEEN EXERCISED

(75) Inventors: Emmett Witchel, Boston, MA (US); Christopher D. Metcalf, Ashland, MA (US); Andrew E. Ayers, Amherst, NH (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

(21) Appl. No.: 09/474,389

(22) Filed: Dec. 29, 1999

(51) Int. Cl.$^7$ ................................................. G06F 9/45
(52) U.S. Cl. ...................... 717/136; 717/124; 717/154; 717/170; 714/37; 714/38; 714/39
(58) Field of Search ................................ 717/124–128, 717/130–132, 135, 121, 122, 139, 141, 151, 154, 155, 156, 158, 136, 170; 712/241; 714/37, 38, 39

(56) References Cited

U.S. PATENT DOCUMENTS

| | | | | |
|---|---|---|---|---|
| 3,711,863 A | * | 1/1973 | Bloom | 714/38 |
| 4,667,290 A | | 5/1987 | Goss et al. | 365/300 |
| 4,694,420 A | * | 9/1987 | Pettet et al. | 717/131 |

(List continued on next page.)

FOREIGN PATENT DOCUMENTS

| | | |
|---|---|---|
| EP | 0 286 361 A2 | 10/1988 |
| EP | 0 372 835 A2 | 12/1988 |
| EP | 0 403 415 A2 | 12/1990 |
| WO | WO 90/01738 | 2/1990 |
| WO | WO 00/11549 | 3/2000 |
| WO | WO 00/54385 | 9/2000 |

OTHER PUBLICATIONS

Lucas, Carine, Steyaert, Patrick, Mens, Kim, "Managing Software Evolution through Reuse Contracts", Programming Technolog Lab, Vrije Universiteit Brussel, IEEE, 1997, retrieved from IEEE database Sep. 4, 2002.*

Rothermel, Gregg and Harrold, Mary Jean, "Selecting Tests and Identifying Test Coverage Requirements for Modified Software", Department of Computer Science, Clemson University, ACM, 1994, retrieved from the ACM database Sep. 4, 2002.*

Rothermel, Gregg and Harrold, Mary Jean, "A Safe, Efficient Regression Test Selection Technique", ACM, 1997, retrieved from the ACM database Sep. 4, 2002.*

(List continued on next page.)

*Primary Examiner*—Tuan Dam
*Assistant Examiner*—Mary Steelman
(74) *Attorney, Agent, or Firm*—Meyertons Hood Kivlin Kowert & Goetzel, P.C.; B. Noël Kivlin

(57) ABSTRACT

A method for determining changed code in a second program binary relative to a first or baseline program binary, where the second program is a different version of the first program, includes translating, responsive to symbol tables and/or control flow representations, machine addresses of both program binaries to symbols. The first and second program binaries are disassembled using the translated symbols. Differences between the two resulting disassemblies are determined, and a list of the differences is created. Differences between the program binaries can be determined by textually comparing the disassemblies, or alternatively, by determining the differences between the control flow representations of the programs. The list of differences can be presented to a user, or alternatively, can be passed to another process for further processing, such as test coverage analysis, code change analysis, or failure analysis, among other analyses. Analyzing changed code coverage includes marking code in the second program which is changed or different from the first program. The second program is then executed in a test environment, and code which is executed is marked as having been executed. Next, the second program is executed in a non-test environment, such as a production environment, and code which is executed in this second environment is marked accordingly. Finally, from the variously marked code, a list of changed code which have not executed in the test environment but have executed in the non-test environment is provided.

58 Claims, 3 Drawing Sheets

U.S. PATENT DOCUMENTS

| | | | | |
|---|---|---|---|---|
| 4,807,182 A | * | 2/1989 | Queen | 715/511 |
| 4,819,233 A | * | 4/1989 | Delucia et al. | 717/129 |
| 4,951,195 A | | 8/1990 | Fogg, Jr. et al. | 364/200 |
| 5,146,586 A | | 9/1992 | Nakano | 395/575 |
| 5,191,646 A | | 3/1993 | Naito et al. | 395/161 |
| 5,241,678 A | | 8/1993 | Futamura et al. | 395/700 |
| 5,265,254 A | | 11/1993 | Blasciak et al. | 395/700 |
| 5,321,828 A | | 6/1994 | Phillips et al. | |
| 5,410,648 A | * | 4/1995 | Pazel | 717/124 |
| 5,428,786 A | | 6/1995 | Sites | 395/400 |
| 5,446,878 A | | 8/1995 | Royal | |
| 5,450,586 A | * | 9/1995 | Kuzara et al. | 714/1 |
| 5,488,714 A | | 1/1996 | Skidmore | 395/500 |
| 5,507,030 A | * | 4/1996 | Sites | 717/136 |
| 5,546,586 A | | 8/1996 | Wetmore et al. | 395/700 |
| 5,615,369 A | | 3/1997 | Holler | 395/709 |
| 5,675,803 A | | 10/1997 | Preisler et al. | 395/704 |
| 5,732,273 A | | 3/1998 | Srivastava et al. | 395/704 |
| 5,732,275 A | | 3/1998 | Kullick et al. | 395/712 |
| 5,758,061 A | | 5/1998 | Plum | |
| 5,764,992 A | | 6/1998 | Kullick et al. | 395/712 |
| 5,790,858 A | | 8/1998 | Vogel | 395/704 |
| 5,802,373 A | | 9/1998 | Yates et al. | 395/705 |
| 5,812,855 A | | 9/1998 | Hiranandani et al. | 395/709 |
| 5,870,607 A | | 2/1999 | Netzer | |
| 5,946,484 A | * | 8/1999 | Brandes | 717/136 |
| 5,966,541 A | | 10/1999 | Agarwal | 395/712 |
| 5,978,588 A | | 11/1999 | Wallace | 395/709 |
| 6,018,747 A | | 1/2000 | Burns et al. | 707/203 |
| 6,071,316 A | * | 6/2000 | Goossen et al. | 717/126 |
| 6,138,270 A | * | 10/2000 | Hsu | 717/125 |
| 6,151,701 A | * | 11/2000 | Humphreys et al. | 717/130 |
| 6,202,199 B1 | * | 3/2001 | Wygodny et al. | 702/183 |
| 6,282,698 B1 | * | 8/2001 | Baker et al. | 717/118 |
| 6,282,701 B1 | * | 8/2001 | Wygodny et al. | 717/125 |
| 6,360,359 B1 | * | 3/2002 | Matsuo | 717/137 |
| 6,393,606 B1 | * | 5/2002 | Davila et al. | 717/127 |
| 6,530,044 B1 | * | 3/2003 | Beeker et al. | 714/57 |

OTHER PUBLICATIONS

Coppieters, K., "A Cross–Platform Binary Diff," *Dr. Dobb's Journal*, May 1, 1995 pp. 32, 35–36.

Ambras, J.P., et al., "Microscope: An Integrated Program Analysis Toolset," *Hewlett–Packard Journal*, 4: 71–82 (Aug. 1, 1988).

Feldman, S.I. and Brown, C.B. "IGOR: a system for program debugging via reversible execution," *Proceedings of the ACM SIGPLAN and SIGOPS Workshop on Parallel and Distributed Debugging*, pp. 112–123 (1988).

Larus, J.R. "Abstract Execution: A Technique for Efficiently Tracing Programs," from *Software Practice & Experience*, GB (Chichester, John Wiley & Sons LTD.) pp. 1241–1258 (Dec. 1, 1990).

"Productivity Tool for Online Tracing of an Assembly LISTING Using a PER TRACE File," *IBM Technical Disclosure Bulletin*, (Nov. 1, 1987).

Ferrante, J., et al., *The Program Dependence Graph and Its Use in Optimization*, pp. 320–349.

Johnson, R., et al., *Dependence–Based Program Analysis*, pp. 78–89.

Aho, Alfred V., *Compilers, Principles, Techniques, and Tools*, pp. 513–580.

Robert C. Bedichek, "Some Efficient Architecture Simulation Techniques," Department of Computer Sciences, University of Washington, Usenix Conference, Jan., 1990.

Robert C. Bedicheck, "Talisman: Fast and Accurate Multicomputer Simulation," 1985, Laboratory for Computer Science, Massachusetts Institute of Technology.

Colin Hunter, et al., "DOS at RISC," Byte, Nov., 1989, pp. 361–368.

Anant AgarwaL, et al., "ATUM: A New technique for Capturing Address Traces Using Microcode," Proceedings of the 13th Annual Symposium on Computer Architecture, Jun. 1986.

Kazuhito, Patch System, Patent Abstract of Japan (CD–ROM), Unexamined Applications, vol. 94, No. 11 (Nov. 8, 1994).

International Business Machines Corporation, Generic Methodology for Code Patching in Binary File, 802–803 (Jun., 1998).

Ammons, G., and Larus, J., "Improving Data–flow Analysis with Path Profiles," *ACM Sigplan Notices, US, Association for Computing Machinery*, 33(5):72–84 (1998).

Ball, T. and Larus, J.R., "Optimally Profiling and Tracing Programs," Technical Report #1031, Rev. 1, Computer Sciences Department, University of Wisconsin—Madison, Sep., 1991.

"Instruction Trace Apparatus. Feb. 1978." IBM Technical Disclosure Bulletin, 20(9):1–3 (Feb. 1, 1978).

Rosen, Kenneth H., et al., *UNIX System V Release 4: An Introduction for New and Experienced Users*, pp. 441–442, Osborne McGraw–Hill (1990).

Aho, Alfred V., et al., *Compilers—Principles, Techniques and Tools*, pp. 429–440 and 475–480, Addison–Wesley Publishing Company (reprinted Mar. 1988).

* cited by examiner

METHOD FOR DETERMINING THE DEGREE TO WHICH CHANGED CODE HAS BEEN EXERCISED

BACKGROUND OF THE INVENTION

For a number of software engineering applications, it would be helpful to know how two related versions of a computer program compare. In particular, if changes are made to a "baseline version" of a program, resulting in a newer or updated version, and if source code is available for both versions, the source code difference of the baseline and current versions is easy to obtain through standard textual comparison tools, such as the UNIX "diff" command.

There are two major problems with this approach. First, the source code may not be available, especially for the older baseline version. Second, and more fundamentally, a source-code difference does not directly point out all the portions of a program that may have different semantics. For instance, if the type, or format, of a program variable is changed, then all the executable code, i.e., computation and logic, that mentions or references that variable will in general be different as well.

For software testing applications, it is desirable to know which code should be re-tested when a program is modified. As shown above, the source code difference is generally insufficient. While this problem can be addressed through additional source-level tools, such as dataflow slicing, that is, determining the dataflow representation for a program, a more direct approach is to compare the executable program binaries obtained by compiling the source code into machine code which incorporates any changes such as, for example, variable format changes.

SUMMARY OF THE INVENTION

Naively comparing program binaries leads to an overwhelming number of "false positives," or insignificant differences, since, for example, adding a line of source code will tend to induce large-scale differences in the new binary, because instruction displacements, that is, explicit distances encoded in instructions, and register assignments, which define exactly which fast hardware memory locations are used, will differ throughout the program.

An embodiment of the present invention accurately finds the different and similar portions of two binaries related by small changes, and can form a mapping between, or correlating, the similar portions, such that information pertaining to the baseline binary can be applied to the current binary.

Therefore, in accordance with the present invention, a method for determining changed code in a second program binary relative to a first or baseline program binary, where the second program is a different version of the first program, includes the step of translating machine addresses of both program binaries to symbols. The first and second program binaries are disassembled using the translated symbols. Differences between the two resulting disassemblies are determined, and a list of the differences is created.

The second program can be an updated version of the first program, or more generally, the first and second programs can simply be two different versions of a program.

Preferably, a symbol table, an address range table, and/or a control flow structure are determined for each of the program binaries, and used to translate machine addresses.

Preferably, differences between the disassemblies, which correspond to differences between the program binaries, are determined by textually comparing the disassemblies, with a utility such as the "diff" program provided by the UNIX operating system, or some other text comparison program.

Each disassembly contains a sequence of instructions, and each instruction occupies a line. For efficiency, each disassembly is preferably transformed into a sequence of "block-instructions," where a block-instruction contains, in a single line, all of the instructions from within a block, and where a block contains a sequence of instructions which ends in a branch. The blocked-instructions from the two versions are then compared using "diff," or a similar program or function.

The set of changed blocked-instructions thus determined can be further refined by breaking each changed blocked-instruction into its component instructions, so that each instruction occupies a line. Again using diff on the instructions within the blocks marked as changed, it is determined which instructions have changed.

Alternatively, differences between the program binaries can be determined by first determining control flow graphs of the disassemblies, and using graph-matching techniques to determine the differences between the control flow graphs.

The list of differences can be correlated to differences between the source statements, and presented to a user, for example, in printed form or on a display, or alternatively, the list can be saved in a file or passed to another process for further processing. For example, the list can be used to aid in test coverage analysis, code change analysis, or failure analysis, among other analyses.

Changes in the second version relative to the first or baseline version may result, for example, by inserting instructions into the first program, or by modifying instructions in the first program, or by deleting instructions from the first program. One change might be where a variable's size is different in the second program binary relative to the first program binary. This could result, for example, from a change in source code, or from use of a different compiler, or even from the same compiler with different options selected. Similarly, changes in the second version relative to the first version may result from a change to a data structure's definition.

In at least one embodiment, known attributes of the compiler(s) which created the program binaries can be used in translating symbols and disassembling binaries. An example is where a known attribute is a standard base register.

Machine addresses can be, but are not limited to, for example, register names, memory addresses including both virtual and physical addresses, and address offsets.

According to another aspect of the present invention, a method for analyzing changed code coverage of a second version of a program relative to a first version, includes marking code in the second program which is changed or different from the first program. The second program is then executed in a test environment, and code which is executed is marked as having been executed. Next, the second program is executed in a non-test environment, such as a production environment, and code which is executed in this second environment is marked accordingly. Finally, from the variously marked code, a list of changed code which have not executed in the test environment but have executed in the non-test environment is provided.

Code can be marked by various groupings, such as, for example, individual code lines, or basic blocks.

In certain applications, coverage results can be obtained on a production run of a baseline program and mapped to a program under test, to determine which portions of the program under test have not executed in the production environment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
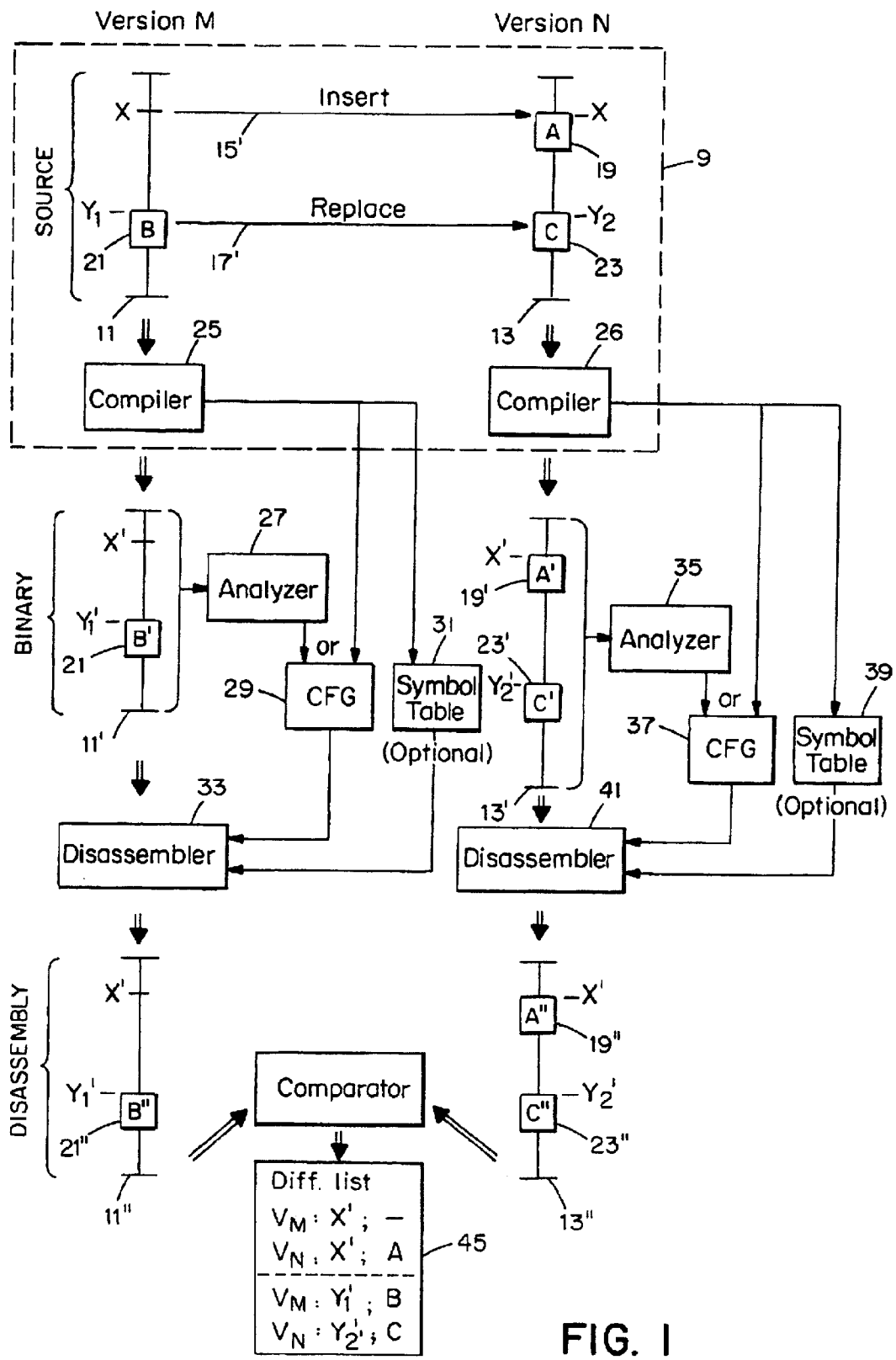
FIG. 1 is a schematic flow diagram illustrating an embodiment of the present invention.

FIG. 1 is a schematic flow diagram illustrating an embodiment of the present invention. Assume that initially, source code 11, shown as a line representing a sequence of source-level instructions, exists for some program. The source code 11 can be written in a high-level language such as C, Pascal, Fortran, etc., or in a lower level language such as assembly language.

Typically, the program source 11 is processed by a compiler 25 (or an assembler if the source code is in assembly language) to produce an executable program binary 11', comprising machine-readable instructions. The executable 11' can then be used for testing or production, or for some other purpose.

Eventually, the program source 11 is updated, due to, for example, bug fixes, enhancements, introduction of new features, deletion of obsolete features, etc. In the illustrative example of FIG. 1, the first or baseline version 11, Version M, is updated to produce a second version 13, Version N, by inserting (step 15) one or more instructions A 19 at location X, and by replacing or modifying (step 17) instructions B 21 with instructions C 23. Note that the insertion of instructions A 19 shifts the instructions which follow, such that the C instructions 23 are at a location Y2 which is offset relative to the location Y, in the baseline program 11.

The source code 13 for Version N is then processed by the compiler 26 or assembler to produce a Version N program binary 13'. The compiler 26 may or may not be the same compiler 25 used to compile the baseline Version M program. Note that instructions A, B and C are compiled into respective binary instructions A', B' and C', each of which is likely to comprise several machine instructions for each line of source code. Furthermore, the location of each compiled source line in the source code 11, 13 has a corresponding location or address in the binary code 11', 13'. Thus lines X, Y, and Y$_2$ in the program source codes 11, 13 correspond to addresses X', Y$_1$' and Y$_2$' in the binaries 11', 13'.

In addition to producing executable program code 11', 13', a compiler often generates a symbol table 31, 39 respectively, which is a data structure used to track names (symbols) used by the program, by recording certain information about each name. Symbol tables are described at pages 429–440 and 475–480 of Aho, Sethi and Ullman, Compilers, Principles, Techniques and Tools (1988), incorporated herein by reference in its entirety. The symbol table is sometimes included with the executable program binary.

The executable can also contain other types of "debug information," such as information that relates binary instructions to source lines, or registers used within a given range of instructions to the source variable name.

Furthermore, compilers are capable of analyzing a program to create a control flow representation 29, 37 of the program. Alternatively, or in addition, an analyzer 27, 35 can produce a control flow representation directly from the respective binary 11', 13'. An example of such an analyzer is described in Schooler, "A Method for Determining Program Control Flow," U.S. Ser. No. 09/210,138, filed on Dec. 11, 1998 and incorporated by reference herein in its entirety.

The present invention seeks to discover the changes or differences between the program binaries 11', 13' of the different versions. In some cases, the source for one or both versions may no longer be available. Thus, the sources 11, 13 and the compilation step 25, 29 are shown inside dashed box 9 to indicate that they occur prior to the operation of the present invention.

As mentioned previously, a naive comparison of the two binaries will yield a near useless number of false differences. The key is to distinguish between those differences that are semantically significant, in terms of the inducing source code differences, and those that are not.

An insignificant difference occurs, for example, where a different register is assigned for the same purpose. All of the instructions that use the new register are impacted, yet it makes little difference which register is actually used. Another example is where the precise layout of instruction sequences, that is their location in a binary or program executable, differs. Yet another example is where the precise offset, or distance from a base location, used to address program variables by the executable instructions, differs.

On the other hand, a significant difference occurs, for example, where the data length in a memory load or store instruction is changed, from, for example, a load byte instruction in one version, to a load long word instruction in the other version. Another example is where the two versions have a different sequence of computational instructions, or where they have a different control-flow structure.

Referring again to FIG. 1, a disassembler 33, 41 converts the program binaries 11', 13' into human-readable assembly code, referred to herein as a disassembly 11", 13". Disassemblers are commonly used to disassemble binary programs to determine how the programs work when no source is available.

In the embodiment of FIG. 1, the disassemblers 33, 41, which may be the same, use the control flow representations 29, 37 and, optionally, symbol tables 31, 39 and/or debug information, obtained by the prior analysis, to translate low-level machine addresses such as "(r5)128," i.e., the address stored in register r5 offset by 128 bytes, into higher-level symbolic addresses such as "(TCB) 128" for 128 bytes from the start of the task control block, or "(SP)12" for 12 bytes from the stack pointer. Many of these base address names, such as start of the task control block, the stack base, the stack frame base and the heap base, are known statically from a knowledge of the computer and/or the instruction set. In addition, this step uses distinguished variable addresses, for example, memory base addresses, contained in certain registers or memory locations. See, for example, Schooler, U.S. Ser. No. 09/210,138, cited above.

Each program binary is "disassembled." A high-level disassembly, the result of converting the binary code into human-readable assembly code by a disassembly process, is then produced, eliding insignificant details such as register numbers and memory offsets, and retaining significant details such as opcodes and symbolic bases. Thus, for each machine instruction, a corresponding opcode is determined, along with a symbolic representation of any memory locations referenced, where a symbolic representation is typically some character string which serves as the name of a variable.

As can be seen from FIG. 1, each disassembly has code sections A", B" and C"(refs. 19", 21" and 23" respectively) corresponding to the machine code sections A', B' and C' respectively (refs. 19', 21' and 23' respectively), which in turn correspond to source code sections A, B and C respectively (refs. 19, 21 and 23 respectively), each section having one or more instructions.

A text comparison utility 43, such as the "diff" command provided by the UNIX operating system, is then used to produce a list 45 of differences between the two disassemblies 11", 13". Since there is a one-to-one correspondence between instructions in the binaries 11', 13' and the disassembled instructions in the disassemblies 11", 13", the listed differences correspond to differences between the binaries.

The textual difference of the high-level disassembly for the two program versions provides the desired result: those portions that are different, and those that are the same, as well as a map from the similar portions from the baseline to the current version.

For example, the difference list 45 of FIG. 1 shows that Version N's binary 13' contains new code A at location X' which Version M's binary 11' does not contain. In addition, the difference list 45 shows that Version M contains code B at location $Y_1'$, while Version N instead contains code C at location $Y_2'$.

For efficiency, each disassembly is preferably transformed into a sequence of "block-instructions," where a block-instruction contains, in a single line, all of the instructions from within a block, and where a block contains a sequence of instructions which ends in a branch. The blocked-instructions from the two versions are then compared using "diff," or a similar program or function.

The set of changed blocked-instructions thus determined can be further refined by breaking each changed blocked-instruction into its component instructions, so that each instruction occupies a line. Again using diff on the instructions within the blocks marked as changed, it is determined which instructions have changed.

This simple textual difference operation will fail if the source-level differences between the two versions are great enough. For some types of differences, more sophisticated algorithms can continue to make an effective comparison. For example, if the current version is mostly re-arranged from the baseline, but retains mostly the same computations in different order, then algorithms that solve the linear assignment problem can be used to discover the correspondence. Algorithms exist for this "linear assignment problem" See, for example, Cormen, T. H., Leiserson, C. E. and Rivest, R. L., *Introduction to Algorithms*, The MIT Press, 1990, incorporated herein by reference.

Sometimes, graph matching algorithms of the two control flow graphs can yield the correspondences. See Cormen, Leiserson and Rivest.

Figure 2:
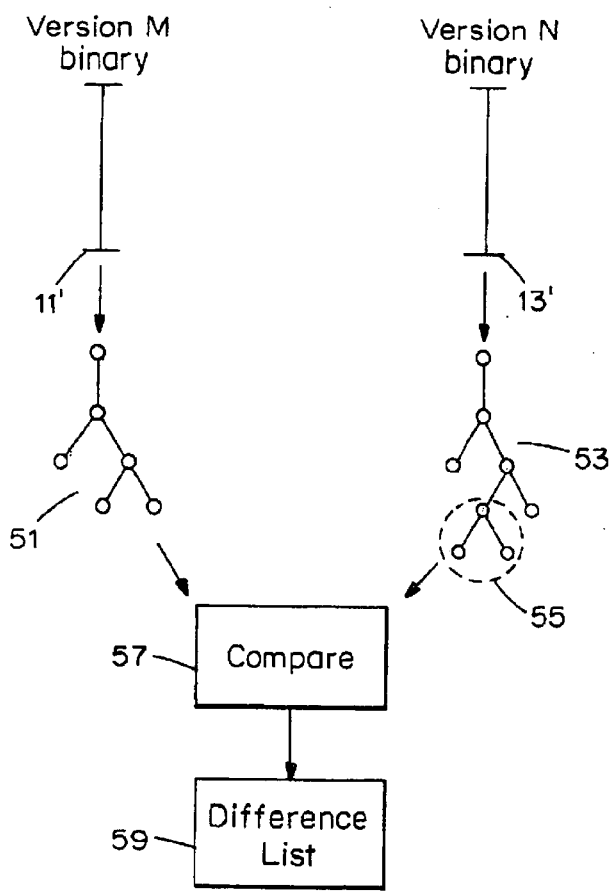
FIG. 2 is a schematic flow diagram illustrating an embodiment of the present invention using graph-matching techniques.

FIG. 2 illustrates such an embodiment of the present invention which uses graph-matching techniques. Each source or binary version (binary shown 11', 13' is analyzed and a respective control flow graph representation 51, 53 is produced for each. In this example, assume that some portion 55 of the second program graph 53 is different from the first program graph 51. The graphs 51, 53, or their representations (not shown) are compared by a graph-matching comparator 57, and a list of differences 59 is produced.

Figure 3:
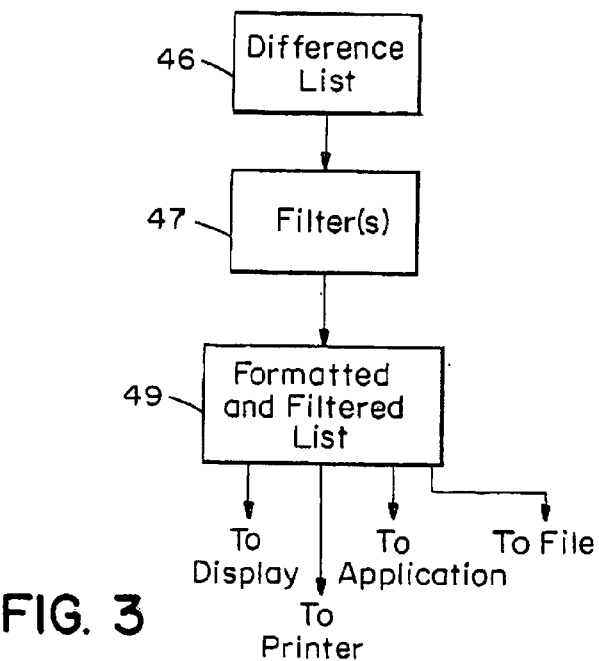
FIG. 3. is a schematic diagram illustrating, in an embodiment of the present invention, the filtering of the difference list.

In, FIG. 3, a difference list 46, which corresponds to the list 45 of FIG. 1, or the list 59 of FIG. 2, or another list produced by another comparison technique, is filtered by one or more filter processes 47 to provide a more desirable format 49 to a user or another computer application, or to filter the information so as to provide only certain information a user wishes to see or that an application needs to use, for example, for a particular routine. Of course, no filter is necessarily required, which is equivalent to a null filter.

The final formatted and filtered list 49 or lists can then be presented to a user via a display, or a printer, or stored in a file for later use, or can be sent to another application for further processing.

One key application of the present invention is in test coverage analysis used to determine what portions of a software program have been exercised in testing. Ideally, 100% of a program should be exercised, or "covered". In practice this is extremely difficult, for instance, because some statements are reached only in rare, exceptional circumstances.

In practice, it is desirable to focus and measure testing on the most important portions of an application. Empirically, the portions that have recently changed, and all the code impacted by those changes, deserve special attention. The binary comparison algorithm of the present invention described above points out precisely those areas.

Another way to focus testing is to concentrate on those areas of the program that are actually run in real use, or "production". Many parts of a program, especially a larger, older program, may not in fact be used in production, since those parts relate to formats or issues no longer relevant. With the present invention, coverage results obtained on a production run of a baseline program, can be mapped to a current program under test, and determine which portions have been exercised in production, but not yet exercised in test.

Figure 4:
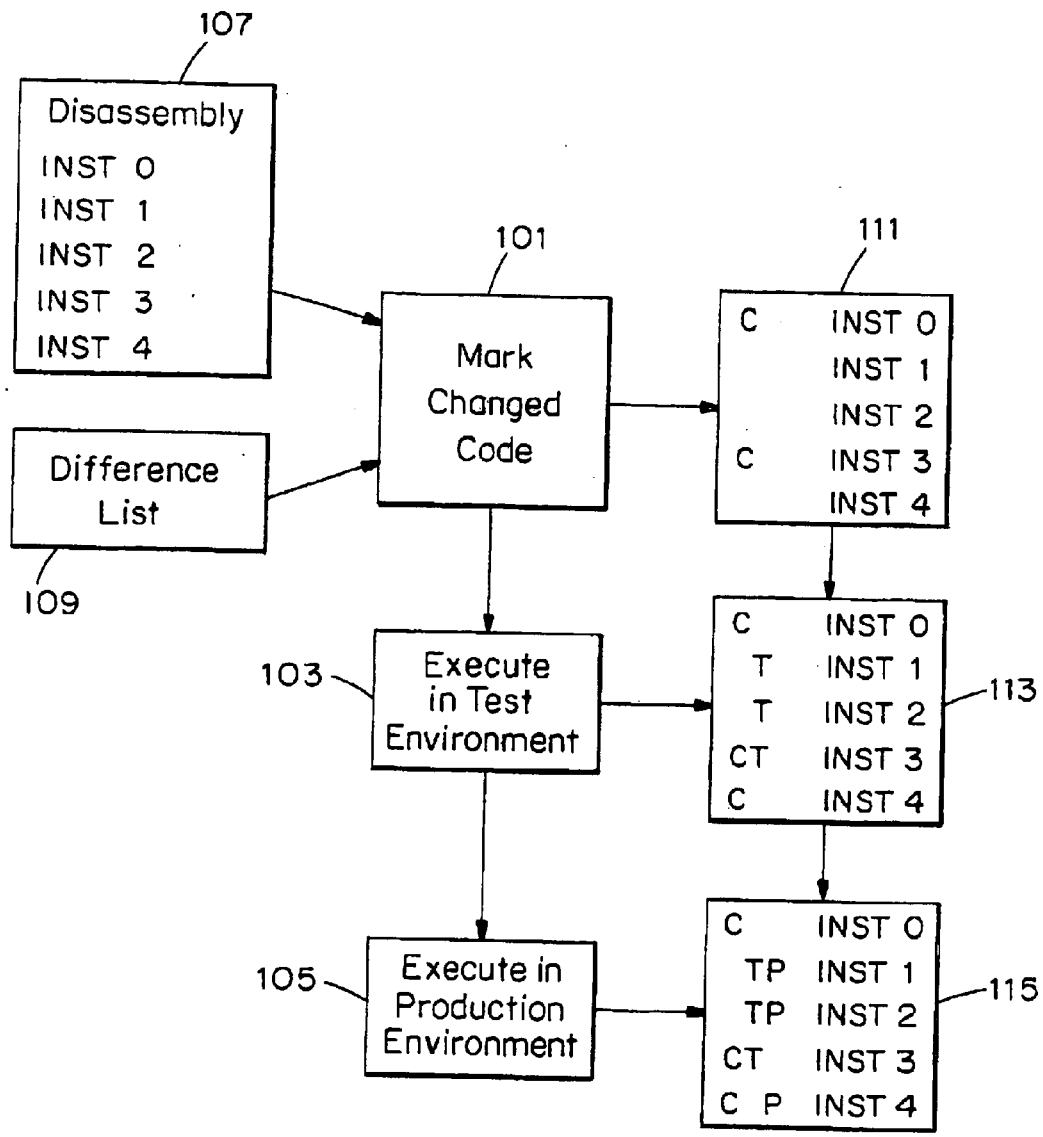
FIG. 4 is a schematic flow diagram illustrating an embodiment of the present invention which analyzes changed coverage of an updated version of a program.

FIG. 4 is a schematic flow diagram of an embodiment of the present invention for analyzing changed code coverage of the second or updated program version. At Step 101, using a disassembly listing 107 of instructions INST 0–INST 4 for the updated version, and the list 109 of differences between the two versions produced as described above, code in the second program which is changed or different from the first program is marked, as shown at 111. In this example, changed instructions are marked with a character "C", however other markings such as flags could also be used. Code markings can be on an instruction by instruction, i.e., line by line, basis as shown, or can be based on some other grouping, for example, on a block by block basis.

At Step 103, the second program is executed in a test environment, and code which is executed is marked as having been executed, here with the character "T", as shown at 113. The order in which the "changed," "listed" or "run in production" markings are made can be interchanged. Similarly, marking can happen before or after the program is run in test or production.

Next, at Step 105, the second program is executed in a non-test environment, such as a production environment, and code which is executed in this environment is marked accordingly, with a "P", as shown at 115. The information at 115 thus simultaneously indicates which instructions have changed, which have been tested, and which have been executed in a production environment.

Code can be marked by various groupings, such as, for example, individual code lines, or basic blocks. Of course, if source code is available, source lines can be shown instead of, or in addition to, the disassembled instructions.

The markings can also be shown to the user alongside the program source code. For this we make use of information such as, for example, a listing file, a symbol table, debug information, or other means, that relates the assembly instruction to source code.

In addition, or alternatively, lines of code in the second program which are impacted due to changes relative to the baseline program are similarly marked. Directly impacted lines, that is, those which are textually changed or added relative to the baseline program are marked with one mark, for example, the character "D", while indirectly impacted lines are marked with a different mark, for example, the character "I".

Indirectly impacted code results where the text of statement has not been changed, but where the statement itself is nevertheless impacted. For example, assume the baseline version "Version 1" and updated version ("Version 2") of some program are as follows, the only difference being the assignment of the value 32 to variable A in Version 1, and the assignment of the value 16 to variable A in Version B:

Version 1:

Integer A=32;

Y=P+Q;

B=A+C;

X=R+S;

Version 2:

Integer A=16;

Y=P+Q;

B=A+C;

X=R+S;

The line "B=A+C" in Version 2 (actually in either version relative to the other) is impacted by the change in the integer declaration but is not textually changed itself. A dataflow analysis will relate the declaration of variable A to its use in the instruction "B=A+C".

Many other software tools can benefit from binary comparison information as well. For instance, failure analysis tools can highlight changed code (relative to a baseline) that was in the path to a failure, since empirically recently-changed code is often the cause of such failures. This highlighting can guide diagnostic engineers more quickly to the root cause of a program failure.

The changed and/or impacted code is itself also useful to the user. It can also be shown to the user at a source code level on described previously, without the "test" or "production" information.

It will be apparent to those of ordinary skill in the art that methods involved in the present system for determining the degree to which changed code has been exercised may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining changed code in a second program binary relative to a first program binary, the second program being a different version of the first program, comprising:
   translating machine addresses of the first and second program binaries to symbols;
   dis-assembling the first and second program binaries to create a respective first and second disassembly, using the translated symbols;
   determining differences between the first and second disassemblies; and
   providing a list of said differences.

2. The method of claim 1, wherein the second program is an updated version of the first program.

3. The method of claim 1, further comprising:
   determining a control flow structure of the first program binary;
   determining a control flow structure of the second program binary, wherein the step of translating machine addresses is responsive to the determined control flow structures.

4. The method of claim 1, further comprising:
   providing symbol tables for the first and second program binaries, wherein the step of translating machine addresses is responsive to the symbol tables.

5. The method of claim 4, further comprising:
   determining a control flow structure of the first program binary;
   determining a control flow structure of the second program binary, wherein the step of translating machine addresses is further responsive to the determined control flow structures.

6. The method of claim 1, wherein translating further comprises:
   finding a correlation between the first and second versions that provides a minimal number of differences.

7. The method of claim 1, wherein determining differences comprises textually comparing the disassemblies.

8. The method of claim 1, wherein determining differences comprises:
   determining control flow graphs of the disassemblies; and
   graph-matching the control flow graphs.

9. The method of claim 1, wherein the list of differences is correlated to differences in source statements.

10. The method of claim 1, wherein the list of differences is provided to a user.

11. The method of claim 10, wherein the list of differences is provided to the user in printed form.

12. The method of claim 10, wherein the list of differences is provided to the user on a display.

13. The method of claim 1, where the list of differences is provided to a processor for further processing.

14. The method of claim 13, wherein further processing comprises test coverage analysis.

15. The method of claim 13, wherein further processing comprises changed code coverage analysis.

16. The method of claim 15, further comprising:
marking lines of code in the second program which are changed from the first program;
executing the second program in a test environment, and marking lines of code which are executed;
executing the second program in a non-test environment, and marking lines of code which are executed; and
providing, responsive to the markings, status indications for the lines of code in the second program, a status indication comprising any or all of:
an indication as to whether code has changed;
an indication as to whether code has executed in the test environment; and
an indication as to whether code has executed in the non-test environment.

17. The method of claim 15, wherein the non-test environment is a production environment.

18. The method of claim 17, further comprising:
mapping coverage results, obtained on a production run of the first program, to the second program; and
determining which portions of the second program have been exercised in production but have not yet been exercised in the test environment.

19. The method of claim 15, further comprising:
marking lines of code in the second program which are impacted due to changes relative to the first program.

20. The method of claim 19, wherein marking lines comprises:
marking lines of code which are directly impacted with a first mark; and
marking lines of code which are indirectly impacted with a second mark.

21. The method of claim 20, further comprising:
performing dataflow analysis to determine indirectly impacted lines of code.

22. The method of claim 13, wherein further processing comprises failure analysis.

23. The method of claim 13, further comprising:
determining a control flow structure of the first program binary;
determining a control flow structure of the second program binary, wherein the step of translating machine addresses is responsive to the determined control flow structures.

24. The method of claim 23, wherein further processing comprises test coverage analysis.

25. The method of claim 23 wherein further processing comprises changed code coverage analysis.

26. The method of claim 23, wherein further processing comprises failure analysis.

27. The method of claim 1, wherein instructions have been added in the second program binary relative to the first program binary.

28. The method of claim 1, wherein instructions have been modified in the second program binary relative to the first program binary.

29. The method of claim 1, wherein instructions have been deleted in the second program binary relative to the first program binary.

30. The method of claim 1, wherein a variable's size is different in the second program binary relative to the first program binary.

31. The method of claim 1, wherein a data structure's structure is different in the second program binary relative to the first program binary.

32. The method of claim 1, wherein translating and disassembling are in response to known attributes of a compiler which created the program binaries.

33. The method of claim 32, wherein a known attribute is a standard base register.

34. The method of claim 1, wherein machine addresses comprise registers.

35. The method of claim 1, wherein machine addresses comprise memory addresses.

36. The method of claim 35, wherein memory addresses comprises virtual addresses.

37. The method of claim 35, wherein memory addresses comprises physical addresses.

38. The method of claim 1, wherein machine addresses comprise memory address offsets.

39. The method of claim 1, where the list of differences is saved in a file.

40. A method for determining changed code in a second program binary relative to a first program binary, the second program being an updated version of the first program, comprising:
determining control flow structures of the first and second program binaries;
providing symbol tables for the first and second program binaries, responsive to the determined control flow structures and to the symbol tables, translating machine addresses of the first and second program binaries to symbols;
dis-assembling the first and second program binaries to create a respective first and second disassembly, using the translated symbols;
determining differences between the first and second disassemblies; and
providing a list of said differences.

41. The method of claim 40, wherein the list of differences is provided to a user.

42. The method of claim 40, where the list of differences is provided to a processor for further processing.

43. The method of claim 42, wherein further processing comprises test coverage analysis.

44. The method of claim 42, wherein further processing comprises changed code coverage analysis.

45. The method of claim 42, wherein further processing comprises failure analysis.

46. A computer memory configured for determining changed code in a second program binary relative to a first program binary, the second program being a different version of the first program, comprising:
a disassembler which translates machine addresses of the first and second program binaries to symbols, and which disassembles the first and second program binaries to create a respective first and second disassembly, using the translated symbols; and
a comparator which determines differences between the first and second disassemblies, and which provides a list of said differences.

47. The computer memory of claim 46, wherein the disassembler further translates machine addresses responsive to determined control flow structures of the first and second program binaries.

48. The computer memory of claim 46, wherein the disassembler further translates machine addresses responsive to symbol tables for the first and second program binaries.

49. The computer memory of claim 48, wherein the disassembler further translates machine addresses responsive to determined control flow structures of the first and second program binaries.

50. The computer memory of claim 46, wherein the comparator is a text comparator.

51. The computer memory of claim 46, wherein the comparator is a graph-matching comparator, responsive to control flow graphs of the disassemblies.

52. The computer memory of claim 46, further comprising:

a correlator which correlates the list of differences to differences in source statements.

53. The computer memory of claim 46, wherein the list of differences is provided to a user.

54. The computer memory of claim 46, where the list of differences is provided to a processor for further processing.

55. The computer memory of claim 54, wherein further processing comprises test coverage analysis.

56. The computer memory of claim 54, wherein further processing comprises changed code coverage analysis.

57. The computer memory of claim 54, wherein further processing comprises failure analysis.

58. A computer program product for determining changed code in a second program binary relative to a first program binary, the second program being a different version of the first program, the computer program product comprising a computer usable medium having computer readable code thereon, including program code which:

translates machine addresses of the first and second program binaries to symbols;

disassembles the first and second program binaries to create a respective first and second disassembly, using the translated symbols;

determines differences between the first and second disassemblies; and provides a list of said differences.

* * * * *